United States Patent
Powell

(10) Patent No.: US 7,578,991 B2
(45) Date of Patent: Aug. 25, 2009

(54) CONCURRENT LOW-PRESSURE MANUFACTURE OF HYPOCHLORITE

(75) Inventor: Duane Powell, Alma, MI (US)

(73) Assignee: Powell Technologies LLC, St. Louis, MI (US)

( * ) Notice: Subject to any disclaimer, the term of this patent is extended or adjusted under 35 U.S.C. 154(b) by 347 days.

(21) Appl. No.: 11/145,636

(22) Filed: Jun. 6, 2005

(65) Prior Publication Data

US 2005/0281731 A1    Dec. 22, 2005

Related U.S. Application Data

(60) Provisional application No. 60/577,568, filed on Jun. 7, 2004.

(51) Int. Cl.
*C01B 11/06* (2006.01)
(52) U.S. Cl. .................................. 423/473; 252/187.26
(58) Field of Classification Search ................. 423/473, 423/472; 252/187.26, 385
See application file for complete search history.

(56) References Cited

U.S. PATENT DOCUMENTS

| | | | | |
|---|---|---|---|---|
| 1,414,059 A | * | 4/1922 | Vorce | 423/473 |
| 3,287,233 A | * | 11/1966 | Aigueperse et al. | 252/187.26 |
| 4,159,929 A | * | 7/1979 | Grotheer | 205/503 |
| 4,330,521 A | * | 5/1982 | Glineur | 423/473 |
| 5,378,447 A | * | 1/1995 | Jackson et al. | 423/475 |
| 6,409,981 B1 | * | 6/2002 | Stitt et al. | 423/241 |
| 2005/0072687 A1 | * | 4/2005 | Hubbard | 205/516 |

FOREIGN PATENT DOCUMENTS

DE            512863        * 11/1930

* cited by examiner

*Primary Examiner*—Ngoc-Yen M Nguyen
(74) *Attorney, Agent, or Firm*—George L. Boller

(57) ABSTRACT

A process for efficient, low-pressure production of sodium or potassium hypochlorite. A liquid containing hypochlorite is introduced into a mixing chamber to create a dispersed liquid phase moving generally downward through the mixing chamber. $Cl_2$ is introduced into the mixing chamber to create a continuous gas phase containing $Cl_2$ moving in concurrent flow, while reacting, with the dispersed liquid phase to produce hypochlorite. The reactants are constrained to pass through a static mixer that aids the reaction without causing any substantial foaming in aqueous hypochlorite that collects at the bottom of the mixing.

1 Claim, 7 Drawing Sheets

CONCURRENT LOW-PRESSURE MANUFACTURE OF HYPOCHLORITE

REFERENCE TO A RELATED APPLICATION AND PRIORITY CLAIM

This application claims the priority of Provisional Application No. 60/577,568, filed on 7 Jun. 2004 in the name of DUANE POWELL.

FIELD OF THE INVENTION

This invention relates to the manufacture of hypochlorite, in particular a process and a plant for the manufacture of sodium or potassium hypochlorite (bleach).

BACKGROUND OF THE INVENTION

One known process for producing high quality aqueous sodium hypochlorite having low chlorate concentration uses certain ejectors, herein sometimes referred to as high-pressure ejectors, to inject NaOH solution into a chlorine gas stream passing through a mixing chamber. The pressure of the solution must be elevated to some superatmospheric pressure in order for the ejectors to work properly. Typical pressures are in the range of 50 psig-80 psig. Pumps are used to develop that pressure for forcing the caustic solution through and out of the ejectors.

Because the ejectors have venturis through which the liquid passes, the accelerating liquid flow creates vacuum that draws chlorine into the flow for mixing with the liquid. The effectiveness of the reaction between the NaOH and the chlorine depends to a significant degree on the turbulence that the ejectors impart to the mixture as it flows downward through the mixing chamber.

The process typically uses pure chlorine gas produced by electrolytic cells and then cooled to a desired temperature (35° C.-40° C. is typical). The cooled chlorine is saturated with water vapor. The pumps and ejectors add cost and complexity to an installation, and they require significant energy input for proper operation. If inert gas is present in the chlorine stream, it can degrade ejector effectiveness.

Increasing the pressure at which the ejectors inject caustic in order to maximize completeness of the reaction and thereby increase production efficiency ultimately leads to the generation of foaming (emulsification) in the liquid product being produced in the mixing chamber. Such foaming is seen to be detrimental to a continuous process. Furthermore, a process that seeks to produce high-strength bleach is more prone to foaming as bleach strength increases.

SUMMARY OF THE INVENTION

The present invention involves the discovery that improved efficiencies in the production of hypochlorite can be attained without those complications by a process that uses concurrent low-pressure flows of caustic solution and chlorine gas.

The present invention enables a plant and process for the production of hypochlorite to be more energy-efficient and to yield improved production efficiencies without generating undesirable foaming or emulsification of the liquid phase.

In a plant and process embodying principles of the invention, caustic solution and chlorine gas are introduced at the top of a mixing chamber. The caustic solution is a constituent of recycle solution to which fresh caustic is added as the process is being performed. The caustic solution is introduced at the top of the mixing chamber in a manner that induces at most a small vacuum as it enters and begins to flow downward through the mixing chamber. Any suitable means for introducing the liquid may be used, such as introducing the liquid through one-or more low-pressure spray nozzles. When such a nozzle is used, the pressure is preferably selected to be just large enough to create the particular spray pattern for which the nozzle is designed. Such a pressure is sufficiently low (30 psig is considered the maximum) that the ejected liquid induces at most only a small vacuum at the top of the mixing chamber.

The chlorine gas is also introduced at the top of the mixing chamber. Because the low-pressure spraying of the caustic solution does not tend to draw chlorine into the mixing chamber, a motive force is used to move the chlorine, and that motive force may be provided by any suitable device, such as a fan. Because the pressure within the mixing chamber is fairly low, power requirements for such a device can also be low. For promoting the reaction of chlorine and caustic to create bleach, the concurrent flow through the mixing chamber is also constrained to pass through a static mixer, which may take any of various forms. The static mixer functions to increase turbulence in the liquid phase so as to enhance mass transfer while imposing only relatively small resistance to flow thereby promoting rapid reaction that is essentially free of foaming. Because the static mixer imposes only relatively small resistance to flow, it avoids the creation of a relatively large pressure drop that would necessitate the introduction of caustic and/or chlorine at relatively higher pressures. Consequently, the process avoids the use of higher pressures that have the tendency to create foaming of the liquid phase as the reaction proceeds. In other words, because the caustic and chlorine are introduced into the mixing chamber with significantly lower mechanical energy, the mechanical energy input into the mixing chamber can be significantly reduced without compromising process efficiency, thereby creating aqueous hypochlorite that is essentially free of foam.

In one respect, the present invention relates broadly to a process for the efficient, low-pressure production of hypochlorite using concurrent flow through a mixing chamber to react the liquid and the chlorine as they pass downwardly through the chamber. For promoting the reaction, the mixing chamber contains some form of static mixer through which the low-pressure flow must pass. The process may be either continuous or batch.

In another respect, the present invention relates broadly to a plant that comprises a concurrent flow mixing chamber for producing hypochlorite either as an intermediate product or as an end product by reacting a dispersed liquid phase containing NaOH with a continuous gas phase containing $Cl_2$ wherein the liquid phase is introduced at low pressure, such as through one or more low-pressure nozzles, and reaction in the concurrent flow is aided by downward passage through some form of static mixer. A specific embodiment of static mixer comprises a cone whose wall is perforated.

Other aspects of the invention relate to more specific attributes.

BRIEF DESCRIPTION OF DRAWINGS

The accompanying drawings, which are incorporated herein and constitute part of this disclosure, illustrate a presently preferred embodiment of the invention, and together with the written description given herein disclose principles of the invention in accordance with a best mode contemplated at this time for carrying out the invention.

DETAILED DESCRIPTION

Figure 1:
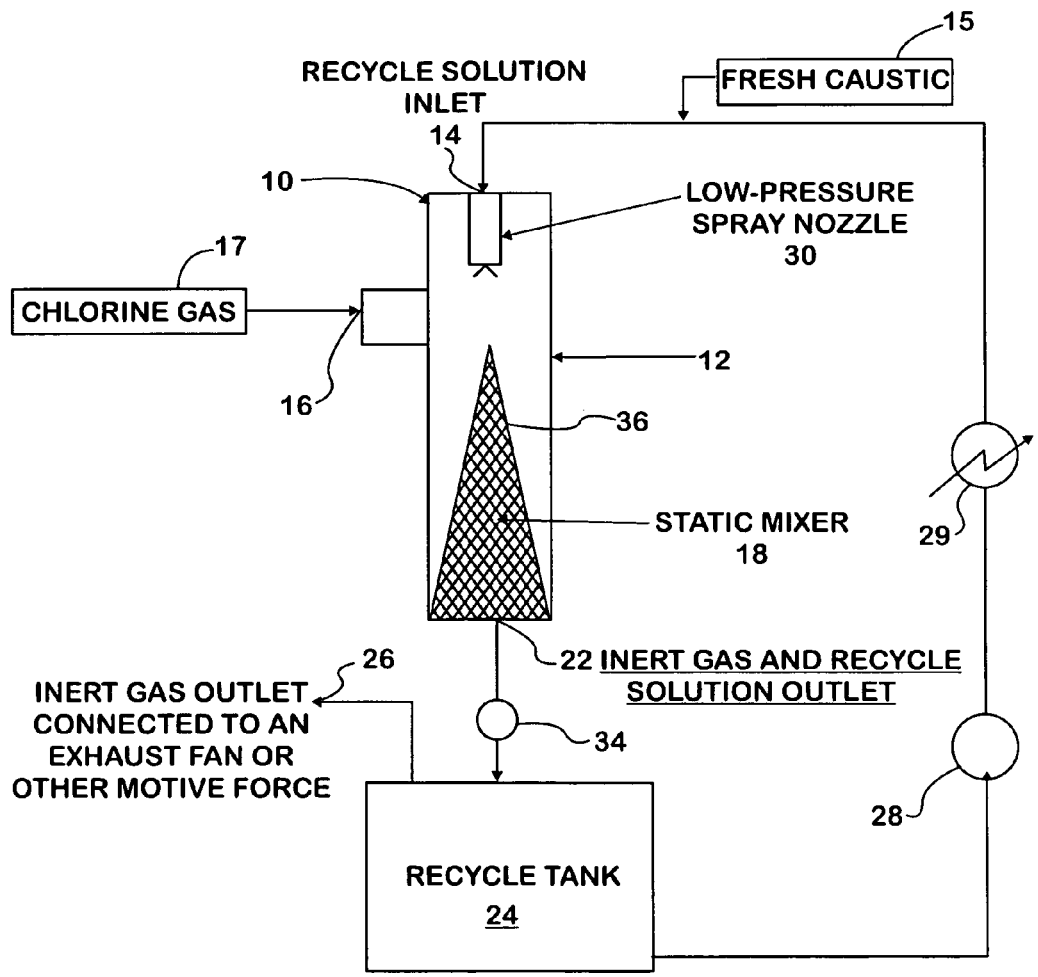
FIG. 1 is a schematic diagram of a portion of a hypochlorite plant employing a continuous process in accordance with a specific embodiment of the present invention.

FIG. 1 shows representative plant equipment for a continuous production of sodium hypochlorite. A mixing chamber 10 comprises a generally vertical housing 12 having two inlets 14, 16. One inlet 14 is for the introduction of liquid that may be a sodium hydroxide solution, sometimes called caustic, from a fresh caustic source 15, a recycle solution, or a mixture of the two; the other inlet 16 is for the introduction of chlorine ($Cl_2$) from a chlorine source 17. The inlets are proximate the top of housing 12.

A static mixer 18 is suitably supported within housing 12 below the two inlets. Housing 12 further comprises an outlet 22 proximate the bottom of the housing below the static mixer. Liquid leaves mixing chamber 10 through outlet 22 to enter a recycle tank 24, while unreacted chlorine and inert gases are drawn off through an outlet 26.

A pump 28 draws some of the liquid from tank 24 as recycle solution and recycles the liquid through a heat exchanger 29 that cools the liquid. The liquid then flows back toward inlet 14 where it can mix with fresh sodium hydroxide solution from fresh caustic source 15 prior to introduction to inlet 14. The proportioning of the fresh and the recycle solutions can be controlled in any conventional manner. Aqueous sodium hypochlorite is drawn out of the system as the product of the process at a suitable location, such as from tank 24 through another outlet (not specifically shown). The aqueous sodium hypochlorite solution can be either an end product or an intermediate product that is used in further processing that ultimately yields an end product.

In the specific embodiment shown here, the recycle solution is introduced into housing 12 through a centrally located low-pressure nozzle 30 that distributes liquid throughout the interior of the mixing chamber so that the entirety of static mixer 18 that faces the top of the housing is wetted. An example of a nozzle that provides desirable distribution is a full cone, narrow angle injector. Such a nozzle is commercially available in various cones angles such as 15°, 20°, and 30° and capable of various flow rates from small to large. These stated cone angles are measured relative to the cone axis, and so the sprays from these three examples would have 30°, 40°, and 60° included angles respectively.

Chlorine gas enters through the side of housing 12 below nozzle 30. As the liquid and gas initially begin to mix during downward passage through the mixing chamber, the chlorine and caustic begin to react and create the hypochlorite. The reaction is further promoted by static mixer 18. An analyzer 34 can be used when it is desired to monitor hypochlorite concentration leaving the mixing chamber through outlet 22.

Static mixer 18 is fabricated to have a defined geometry using material that is strong and unaffected by the reactants passing through the mixing chamber. Certain plastics and metals are suitable materials.

Figure 5:
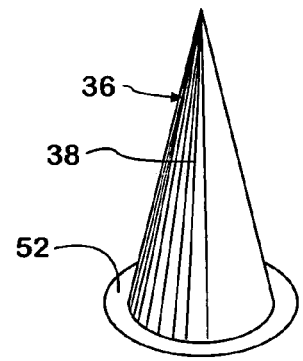
FIG. 5 is a perspective view of the static mixer, specifically a cone, of the assembly FIG. 2 shown by itself.

The specific static mixer shown here in FIG. 5 comprises an upright cone 36 that is open at its base and suitably supported within housing 12 such that the cone axis is coincident with the central vertical axis of the mixing chamber and that of the conical spray of liquid from nozzle 30. The conical cone wall 38 is perforated by multiple openings although they are not specifically shown in FIG. 5.

Figure 8:
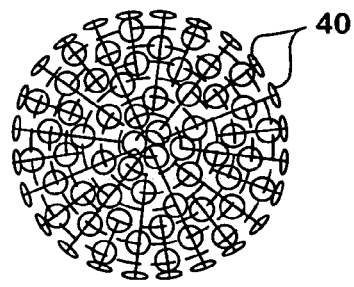
FIGS. 6, 7, and 8 are top views, on different scales, showing several different through-hole patterns for the cone wall.
Figure 6:
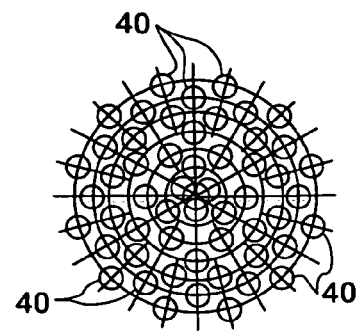
Figure 7:
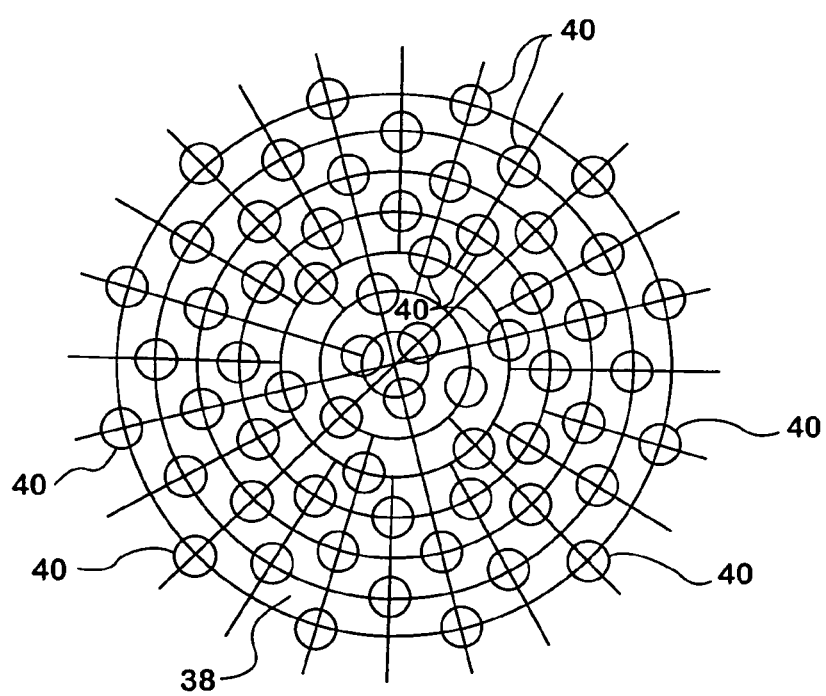

FIGS. 6, 7, and 8 however show examples of several other through-opening patterns for cones. A particular through-opening pattern for a cone depends on various factors in a particular mixing chamber. All through-openings 40 shown in FIGS. 6, 7, and 8 are circular through-holes of uniform diameter. All through-holes 40 have their cylindrical wall surfaces parallel to the cone axis in the particular examples of FIGS. 6 and 7. FIG. 8 shows that a majority, but not all, of through-holes 40 have their cylindrical wall surfaces parallel to the cone axis. The through-holes 40 that are near the base of the cone are non-parallel to the cone axis, serving to facilitate drainage of liquid through the cone where the cone wall meets the mixing chamber wall.

The conical portion of the cone shown in the example of FIG. 5 is fabricated from a flat sheet of suitable material such as titanium. Holes 40 are drilled in the sheet in a desired pattern. The sheet has a shape and thickness that allows it to be formed into the conical shape. Edges of the sheet have suitable margins so that they can be joined together after the sheet has been formed into the conical shape. The specific example of hole pattern in the sheet is one that has 5/8" diameter holes on a 3/4" triangular pitch. This means that the holes are drilled such that if a triangle is drawn between the centers of three adjacent holes, the sides of the triangle would be 3/4" in length. The holes are drilled in the flat sheet before the sheet is rolled into the shape of a cone. The axes of the holes 40 in the FIG. 5 embodiment are therefore essentially perpendicular to the conical surface. In this embodiment the cone presents approximately a 63% open area for flow.

The recycle rate of liquid is preferably one that has a 5:1-10:1 ratio relative to the rate at which the aqueous hypochlorite product is withdrawn. In other words, the rate at which liquid is introduced into the mixing chamber through nozzle 30 is five to ten times that rate at which the product solution is withdrawn from the process. Even higher recycle rates can yield improved process efficiency in hypochlorite production. As the concurrent gas/liquid flow passes downward through the mixing chamber, some of the flow is deflected because it hits the surface of the cone wall 38. This creates turbulence that promotes the reaction of caustic and chlorine. Through-holes 40 create relatively little restriction because they collectively present a relatively larger open area for flow through wall 38 in relation to a relatively smaller closed area presented by the wall. They do however serve to cause the flow to accelerate to some extent as it passes through each of them. That promotes further turbulence as the flow passes through the interior of the cone and finally exits through the open base of the cone.

The turbulence created by cone 36 is one that promotes the reaction of chlorine and caustic without generating undesired foaming of the liquid. Being entirely static, the static mixing process itself introduces no mechanical energy into the mixing chamber, unlike mechanical devices such as an agitator. The motive forces for flow through the mixing chamber are externally supplied, as pointed out earlier. Undesired foaming that may occur in known high-pressure manufacturing processes is foaming that interferes either with process equipment and/or with product quality. A lesser degree of foaming that does not interfere with process equipment or product quality may be considered tolerable. When undesired foaming occurs in a high-pressure process, it is typically corrected by one or more of: 1) introducing a de-foaming or anti-foaming agent; 2) reducing the strength of the product being manufactured; and 3) lowering nozzle pressure.

Figure 3:
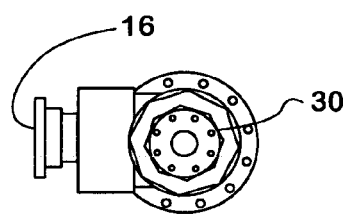
FIG. 3 is a top plan view of FIG. 2.
Figure 2:
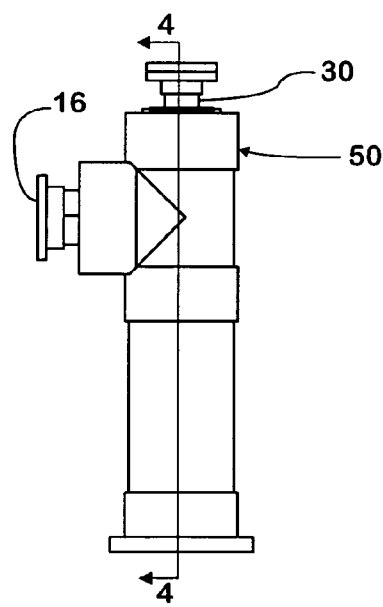
FIG. 2 is a front elevation view of an example of an assembly that can be used in the plant and process of FIG. 1.
Figure 4:
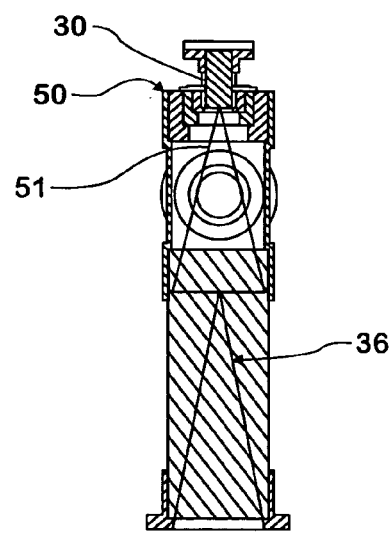
FIG. 4 is a vertical cross section view in the direction of arrows 4-4 in FIG. 2.

FIGS. 2, 3, and 4 show an assembly 50 containing cone 36 and nozzle 30. The specific spray nozzle 30 ejects a full cone spray 51 having a 15° cone angle as measured from the vertical axis. Cone 36 has a vertical height of 30 inches. A flange 52 at the base of the cone has an outside diameter of 15 inches and an inside diameter of about 11.125 inches. In assembly 50, the tip of the cone is about 23.875 inches below the outlet of nozzle 30. Inlet 16 is located vertically approximately midway between the nozzle outlet and the cone tip. Housing 12 is constructed of any suitable material. Cone 36 is supported within the mixing chamber by sealed capture of flange 52 between sections of housing 12.

The invention can be applied to both continuous and batch production processes. In the batch system, some quantity of caustic is introduced at the start of the process, and the liquid product is recirculated during the process until a desired concentration of sodium hypochlorite is indicated by analyzer 34.

The concurrent low-pressure flow in either a continuous or a batch process provides advantages and benefits that include:

1) the ability to produce a high-strength solution of sodium hypochlorite having very low sodium chlorate concentration at low excess caustic levels; a typical example of such a solution is one having 180-200 grams/liter sodium hypochlorite (available chlorine), 3-5 grams/liter excess caustic, and 1-2 grams/liter sodium chlorate at 32° C. using cooling tower water as the cooling fluid. The use of chilled water to produce the same range of concentration of sodium hypochlorite at lower temperature such as 20° C. will yield an even smaller concentration of sodium chlorate.

2) by avoiding large energy inputs to the liquid phase as is required by the high-pressure ejectors, foaming of the hypochlorite solution can be avoided, even with large flows, eliminating any need for a de-foaming agent.

3) because the force for introducing the liquid into the mixing chamber can be small, especially when compared to that required by ejectors, the mixing chamber can operate at low pressure, i.e. at or near atmospheric 0 to –6 inches water column, although it can also operate at somewhat higher pressures; the only energy required for the liquid phase is the energy needed to return the recycle liquid to the top of the mixing chamber where it can then fall downward under the force of gravity or with supplying just enough energy to achieve a desired spray pattern such as those described earlier where the pressure across a nozzle does not exceed 30 psig, and that energy can be provided by small horsepower pumps relative to those used in ejector systems;

4) the mixing chamber can be designed and operated to cause any amount of chlorine to be absorbed (90% to 100% is typical)—and this can be done because any excess chlorine would typically go to a downstream scrubber; what is important is that the sodium hypochlorite/sodium hydroxide solution leaving the bottom of the mixing chamber have some small amounts of excess caustic in it. Even if there is a small amount of chlorine leaving the mixing chamber, it does not create the sodium chlorate levels that would be typical in other systems, such as a countercurrent system where the highest concentration of chlorine reacts with the lowest concentration caustic.

Although the use of a single low-pressure spray nozzle centered on the mixing chamber axis has been shown in the illustrated embodiment for the introduction of liquid, other embodiments may employ other means for introducing the liquid so long as they introduce the liquid in a manner that induces no significant vacuum in the vicinity of the zone of the mixing chamber where the liquid is introduced. Gravity provides sufficient force for the concurrent flows and in conjunction with the static mixer, creates turbulence for promoting the reaction without undesired foaming of the liquid. And as mentioned before any form of static mixer may be used.

Figure 9:
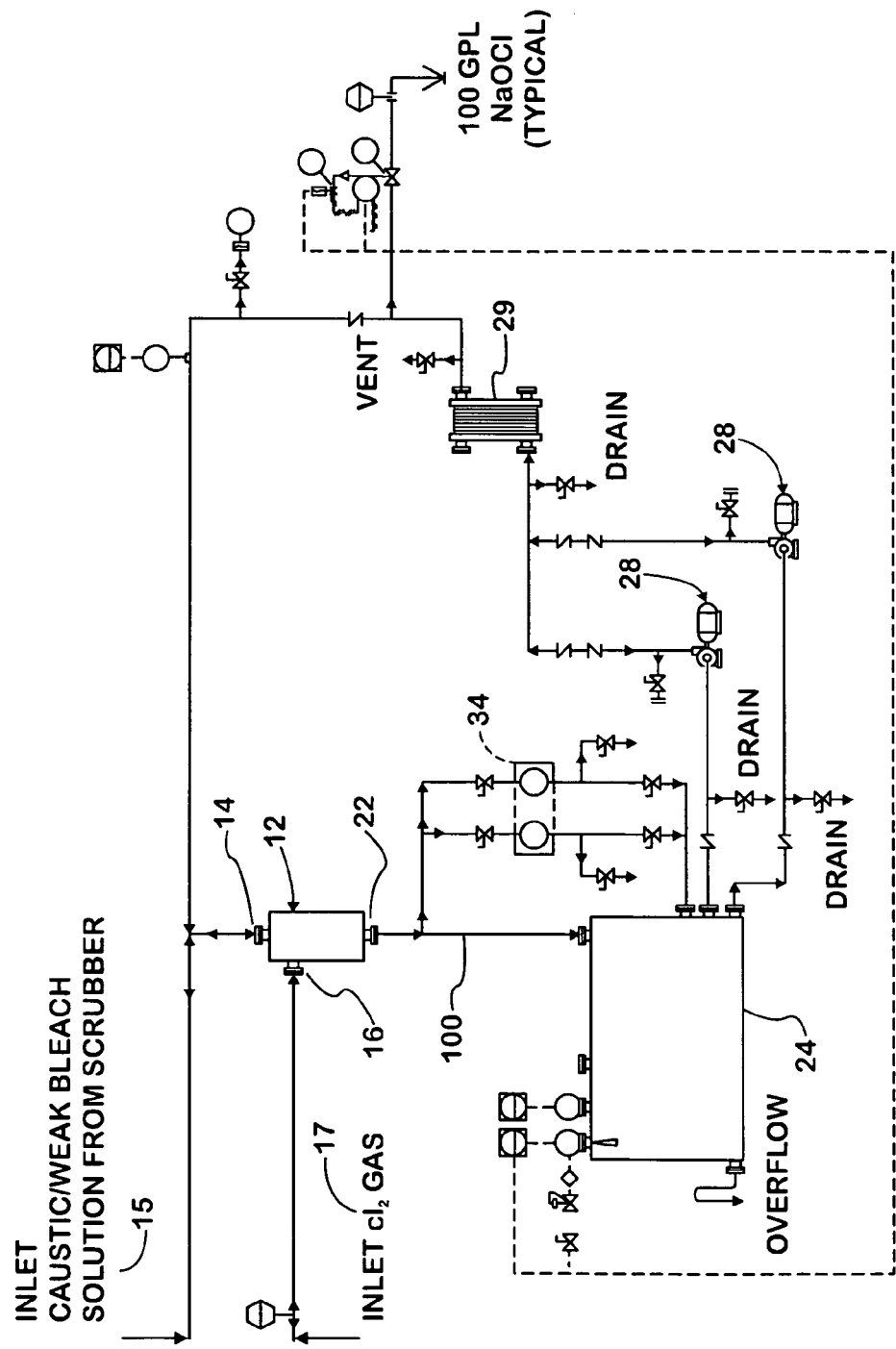
FIG. 9 is a more detailed schematic diagram.
Figure 10:
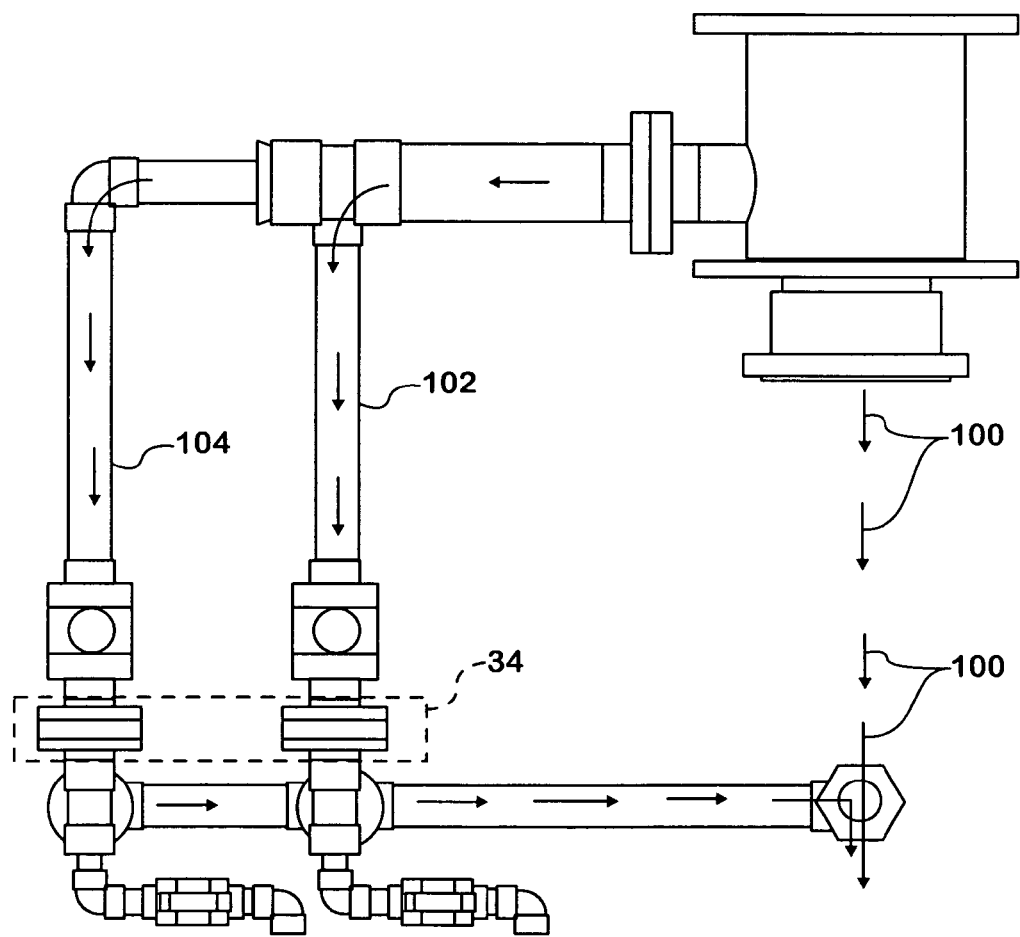
FIG. 10 is a front elevation view of an assembly represented by portions of the diagram of FIG. 9.
Figures 11, 12:
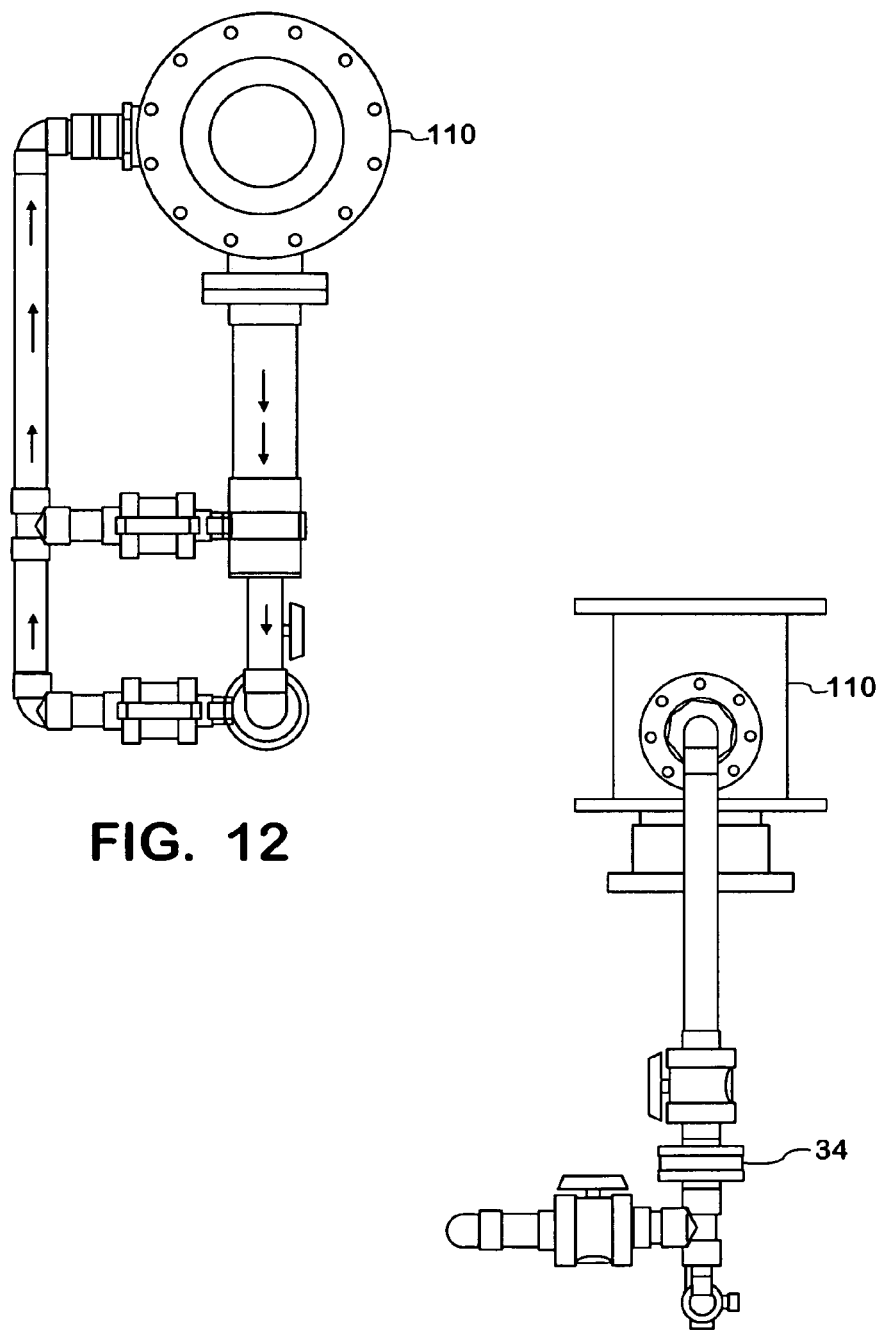
FIG. 11 is a side elevation view of FIG. 10.
FIG. 12 is a top plan view of FIG. 11.
Figure 13:
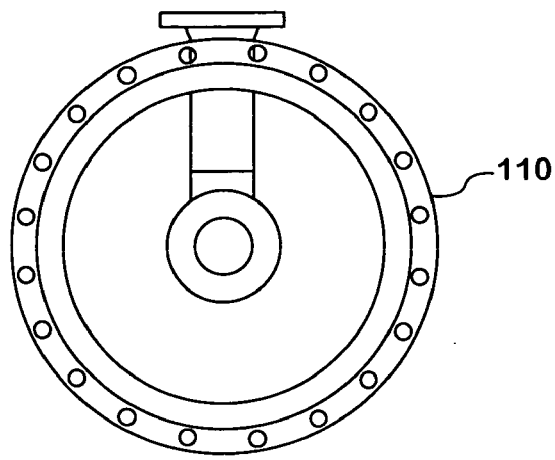
FIG. 13 is a top plan view of a portion of the assembly of FIGS. 10-12.
Figure 14:
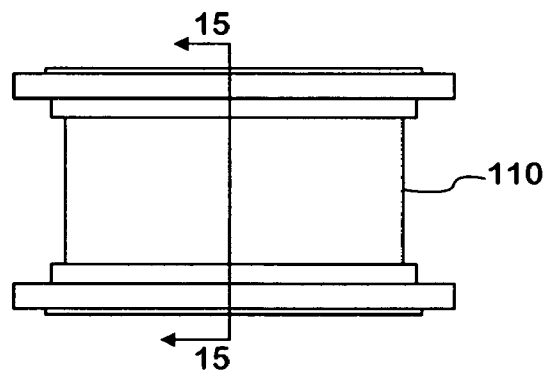
FIG. 14 is a front elevation of FIG. 13.
Figure 15:
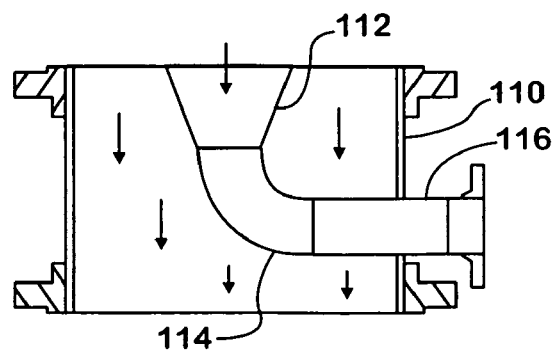
FIG. 15 is a cross section view in the direction of arrows 15-15 in FIG. 14.

FIG. 9 is a more detailed schematic where the same reference numerals designate components previously described. FIGS. 10-15 show detail of an assembly 100 that is present between mixing chamber 12 and recycle tank 24. Assembly 100 provides a means for incorporating analyzer 34 and comprises a main passage 102 between outlet 22 and tank 24 and parallel branch passages 104, 106. The branch passages serve to shunt a portion of the solution to ORP probe sets 108, 110 that form analyzer 34.

The liquid leaving mixing chamber 12 passes through piping 112 that forms main passage 102. The branch passages 104, 106 are formed by piping 114 that has a funnel 116 centrally located within a part 118 of piping 112. Funnel 116 forms the entrance for the branch passages. A horizontal pipe 120 extends from funnel 116 through the wall of part 118 and thence to a vertical pipe 122 that branches to housings 124, 126, each containing a respective set of probes 108, 110.

Because the probes need to be kept immersed in the liquid, the housings contain traps, and the probes themselves are located in the traps. Liquid that has passed through the housings is returned either to the recycle tank itself as shown in FIG. 9, or alternatively to the main flow prior to the recycle tank.

Rather than using traps to keep the probes immersed, placement of the probes at vertical elevations below that of the liquid in the recycle tank will assure immersion.

Potassium hydroxide can be substituted for sodium hydroxide to produce potassium hypochlorite in a similar manner.

While a presently preferred embodiment of the invention has been illustrated and described, it should be appreciated that principles of the invention are applicable to all embodiments that fall within the scope of the claims that follow hereinafter.

What is claimed is:

1. A process for efficient, low-pressure production of sodium hypochlorite comprising:
   introducing a liquid containing sodium hydroxide into a mixing chamber to create a dispersed liquid phase moving generally downward through the mixing chamber;
   introducing $Cl_2$ into the mixing chamber to create a continuous gas phase containing $Cl_2$ moving in concurrent flow, while reacting, with the dispersed liquid phase to produce sodium hypochlorite;
   and constraining the reactants to pass generally downward through a static mixer that aids the reaction as the reactants move generally downward through the mixing chamber without causing undesired foaming in aqueous sodium hypochlorite that collects at the bottom of the mixing chamber wherein the step of constraining the reactants to pass through the static mixer comprises constraining the reactants to pass through openings in the wall of a cone.

* * * * *